Oct. 10, 1972  R. P. GOLDSTEIN ETAL  3,697,227
CHEMICAL CONSTITUENT SAMPLER
Filed May 13, 1966  3 Sheets-Sheet 1

WITNESSES:
Leon M. Garman
Lee P. Johns

INVENTORS
Robert P. Goldstein and
Frank R. Agnew.
BY
Frederick Hoyer
ATTORNEY

Oct. 10, 1972  R. P. GOLDSTEIN ETAL  3,697,227
CHEMICAL CONSTITUENT SAMPLER
Filed May 13, 1966  3 Sheets-Sheet 2

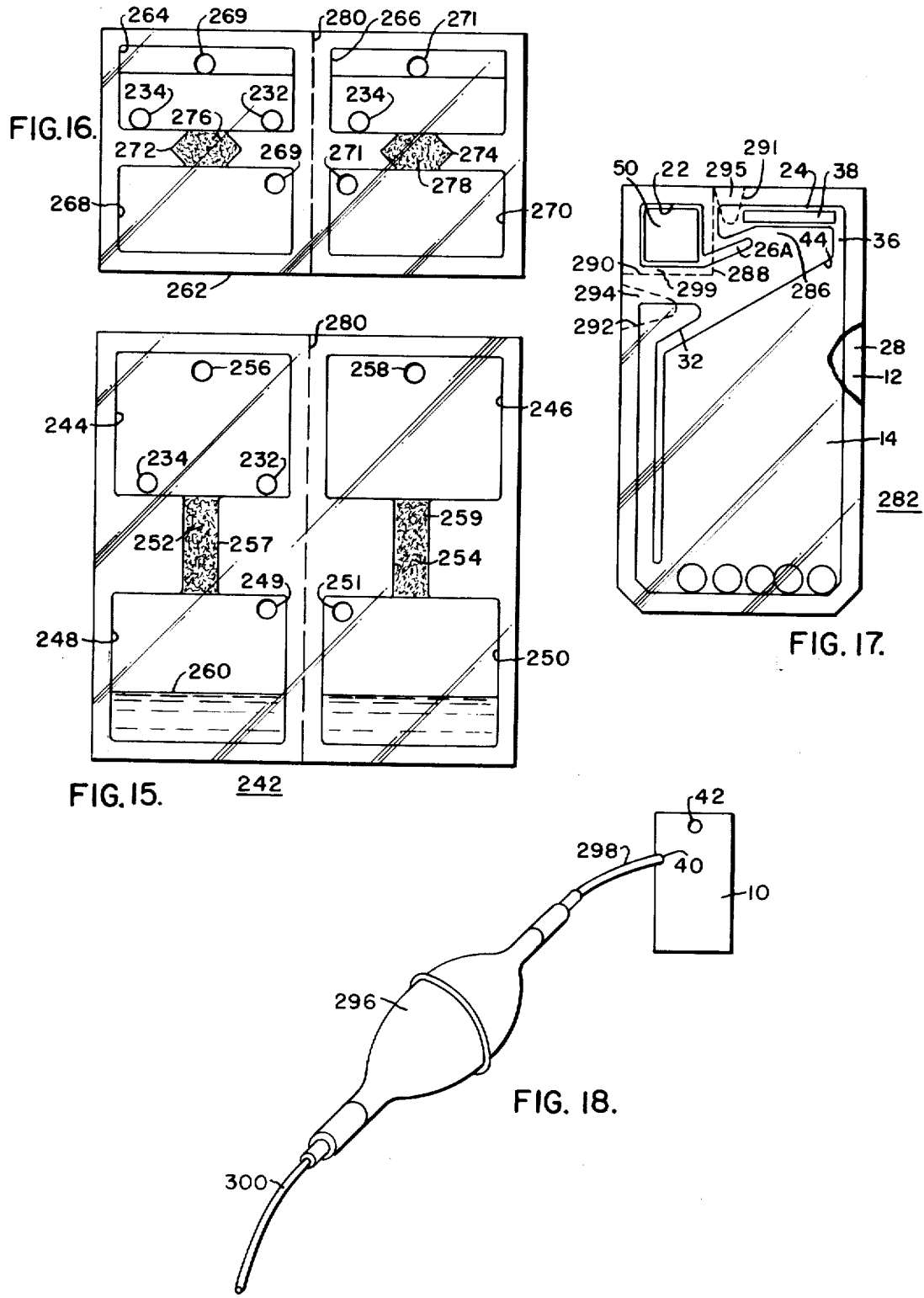

United States Patent Office 3,697,227
Patented Oct. 10, 1972

3,697,227
CHEMICAL CONSTITUENT SAMPLER
Robert P. Goldstein, Forest Hills, and Frank R. Agnew, Penn Hills, Pa., assignors to Westinghouse Electric Corporation, Pittsburgh, Pa.
Filed May 13, 1966, Ser. No. 549,862
Int. Cl. G01n 31/00
U.S. Cl. 23—253 TP
12 Claims

ABSTRACT OF THE DISCLOSURE

A disposable sampler for testing for the presence of constituents in fluids comprising a laminated package having a base sheet and a retainer sheet, the sheets being composed of relatively impermeable materials, the base sheet having a fluid-holding chamber, the retainer sheet being applied to the base sheet and covering the chamber, detachable opening means leading to the chamber including a fluid inlet in one of the sheets, and a cover sheet detachably mounted on said sheet and covering the inlet in a fluid-tight manner.

---

This invention relates to a device for rapidly testing for the presence of chemical constituents, such as contaminants, in fluids. More particularly, it pertains to a disposable device for quickly and conveniently identifying the possible existence and the type of contaminating or other constituent.

The pollution of air and streams has created a need for determining whether a particular contaminant is present and in what amount. In order to detect the presence of a specific chemical in a fluid, a test should be rapidly and conveniently performed. That is particularly true for testing on location or in the field where a contaminated fluid is present. Frequent tests may be required for chemical contaminants in air and water. A typical colorimetric water test requires the addition of selected chemical reagents to a sample in proper sequence and quantity to produce color changes in the sample from which the analyst can determine whether or not a given constituent is present and in what amount.

In the past such tests have been conducted in accordance with standard procedures in laboratories where reagents for testing are bulk stored in labeled bottles and the like. Proper amounts of reagents are measured by the use of laboratory balances, pipettes and graduates, which reagents in turn are handled and mixed in conventional chemical glassware. When the test is completed, the glassware must be cleaned, the reagent bottles are returned to storage, and other equipment is returned to its original state. All of the foregoing procedures involves appreciable time and effort and cannot be conveniently performed outside of the laboratory.

Where the frequency of testing is high, it is economical to apply continuous detection instrumentation as a replacement for the individual sample test technique. Equipment of the continuous testing type has the disadvantage of higher cost and complexity, as well as being limited in the number of contaminants that can be detected by any individual unit. In addition, if electronic circuitry is involved, mantenance by trained personnel is requred.

A more comprehensive analysis may be performed by spectographic methods. However, the apparatus is elaborate, and an interpretation of results is generally more difficult than any of the foregoing procedures. Field use of this equipment is almost impractical and a high degree of operator skill is needed.

Accordingly, a need has developed for an inexpensive test which may be conveniently performed in the field, without requiring highly trained personnel.

In accordance with this invention, it has been found that the foregoing problems may be overcome by the use of an inexpensive chemical contaminant sampler which may be discarded or disposed of after a single use. The sampler device may be designed for use for determining the presence of several specific unknown contaminants where a variety of chemical contaminants may be present. The chemical contaminant sampler replaces the standard laboratory apparatus and glassware used in similar applications.

Accordingly, it is a general object of this invention to provide a unitary chemical constituent sampler which is susceptible to the rapid testing of fluids by using premeasured reagents.

It is another object of this invention to provide a chemical constituent sampler which combines the function of many separate pieces of equipment into one unitary sampler for at least one specific test on a fluid.

It is another object of this invention to provide a chemical contaminant sampler by which a test on a fluid requiring the use of a sequence of reagents may be performed in a simplified and expeditious manner, and may be readily disposed of after use.

It is another object of this invention to provide a chemical contaminant sampler which may be used by unskilled personnel and which is disposable after its use.

It is another object of this invention to provide a chemical contaminant sampler having a size convenient both for carrying in a user's pocket and for hand manipulation.

Finally, it is an object of this invention to accomplish the foregoing objects and desiderata in a simple and effective manner.

Briefly, the device of the present invention accomplishes the foregoing objects by providing a sampler device for testing for the presence of chemical contaminants in fluids including a relatively flat laminated package having a formed base sheet, a retainer sheet, and a protective cover sheet, the sheets being composed of relatively impermeable materials, the base sheet having a pocket, a recess, and channel extending between the recess and pocket, one of the base sheet and retainer sheet having opening means communicative with the pocket for admitting fluid to be tested, chemical reagent means within the pocket and reactive with an agent in the fluid to be tested to yield a colorimetric test result, and the cover sheet being detachably sealed over the retainer sheet to seal the opening means until the cover sheet is removed for conducting a test.

More specifically, the invention is directed to an elongated, relatively flat, laminated package including at least one formed base sheet, a retainer sheet, and a cover sheet, the sheets being composed of impermeble materials; the formed base sheet having at least one pocket means for containing the sample fluid to be tested and for reacting the fluid sample with a reagent; the retainer sheet having at least one opening for introducing the fluid sample into the pocket; and the cover sheet being detachably secured to the retainer sheet in a fluid tight manner; whereby the laminated package provides a readily usable sampler for detecting the presence of chemical contaminants, and whereby the package with the cover sheet detached a sampler suitable for detecting the presence of at least one constituent in a fluid. The sampler may be small enough to carry, as in a pocket, and may be discarded after use.

For a better understanding of the nature and objects of this invention, reference is made to the drawings, in which.

Figure 14:
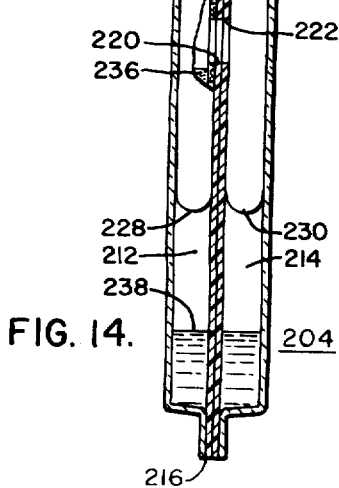
FIG. 14 is an end view showing the manner in which two half portions of the sampler of FIG. 13 are folded together for the purpose of comparing the colors of the solutions in separate compartments of the sampler.

FIGS. 15 anl 16 are plan views of other embodiments of the sampler of FIG. 14;

FIG. 17 is a plan view of one of the embodiments of the invention showing the manner in which a solution containing blister may be separated from the remainder of the sampler by providing a score line for easy detachment and showing the use of score lines for providing an opening for a fluid inlet and vent; and FIG. 18 is a schematic view showing the manner in which a double acting rubber bulb may be attached to the inlet vent of one of the embodiments of the invention to pump a gas containing a suspected contaminant into the sampler.

Figure 1:
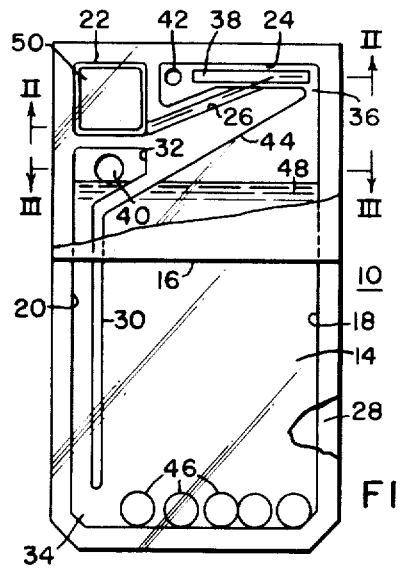
FIG. 1 is a top plan view (in substantially actual size) of a fluid sampler for detecting chemical contaminants in fluids and showing only a portion of a peelable cover sheet intact.
Figure 2:
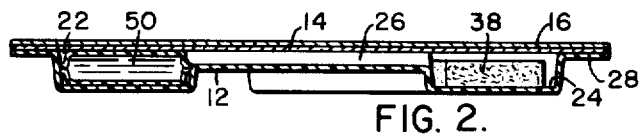
FIG. 2 is an enlarged transverse sectional view taken on the lines II—II of FIG. 1.
Figure 3:
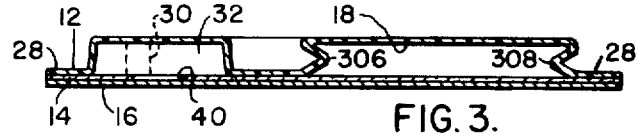
FIG. 3 is an enlarged transverse sectional view taken on the lines III—III of FIG. 1.

In FIGS. 1, 2, and 3 a sample 10 is shown in accordance with the invention, comprising an elongated, relatively flat, laminated package including the base sheet 12, a retainer sheet 14, and a cover sheet 16. The sheets 12 and 14 are coextensive. Only a portion of the cover sheet 16 is shown in FIG. 1 to clearly illustrate the top side fo the sampler when the cover sheet is removed.

For construction purposes as well as convenient handling of the sampler 10, the base sheet 12 is a molded member having an enlarged chamber 18, a channel 20, a pocket 22, a compartment 24, and a channel 26. The portions of the base sheet 12 between the several molded portions 18 to 26 are sealed to the adjoining surface of the retainer sheet 14. Likewise, the peripheral portion of the sheet 12 and 14 are sealed together such as by heat sealing by the application of heat and pressure from a die to the sheets 12 and 14 or by adhesives or other means known in the art. For example, peripheral portions 28 are sealed together in a fluid-tight manner. Similarly, the channel 20 is separated from the chamber 18 by an elongated sealed portion 30.

As shown in FIG. 1, the upper end of the channel 20 is enlarged at 32 and the lower end 34 of the channel communicates with the lower portion of the chamber 18. Similarly, the upper end of the chamber 18 communicates through a channel 36 with the compartment 24. The channel 26 extends between the pocket 22 and the compartment 24. A strip 38 of absorbent material is disposed within the compartment 24.

The retainer sheet 14 is preferably flat and is provided with a fluid inlet 40 and a vent 42. The fluid inlet 40 communicates with the enlarged channel portion 32 and the vent 42 is disposed at the left end of the compartment 24 as viewed in FIG. 1. The upper end of the chamber 18 is preferably inclined at 44 toward the communication opening 36 at the right end of the compartment 24.

The base sheet 12 and the retainer sheet 14 are composed of material that is flexible and impermeable to fluids, such as a metal foil. The sheets may also be composed of a synthetic plastic film, for instance of a fluorinated polymer such as monochlorotrifluoroethylene polymer, polytetrafluoroethylene, and vinyl, and are sold under the trademarks Kel-F, Teflon (FEP), and Aclar. The sheets 12 and 14 may have a thickness ranging from 4 to 20 mils with a preferred range of 8 to 15 mils and an optimum thickness being from 9 to 11 mils. The thickness may depend upon the material used. The sheets should be impermeable and have good flexibility and have sealing qualities so that the base sheet 12 and the retainer sheet 14 may be tightly bonded together. If the sheets are excessively thick, they cannot be readily sealed together to provide for fluid tight seals between the several chambers, compartments, and channels as indicated. The base sheet 12 preferably has a background color such as white to more readily see any color change. It is molded to provide the several chambers, compartments, pockets, and channels. The retainer sheet 14 is preferably transparent.

The cover sheet 16 is detachably secured to the upper side of the retainer sheet 14. The cover sheet 16 is composed of an impervious material such as a metal foil or an adhesive cloth. The cover sheet 16 seals the fluid inlet 40 and the vent 42 from the atmosphere to prevent contamination of the interior of the sampler during storage and prior to actual use.

Among other things, the sampler 10 may be used to test for the presence of arsenic in water. For this purpose, the sampler functions as a Gutzeit generator. Two standard types of colorimetric test for arsenic are usable with the sampler 10. They are the mercuric chloride (or mercuric bromide) test and the silver diethyldithiocarbamate test. The Gutzeit generator is provided with a mixture of zinc metal and an acid salt such as potassium bisulphate ($KHSO_4$) in a convenient form such as compressed pellets 46 in the chamber 18. The strip 38 of absorbent materials such as glass fiber or a cellulose base paper is preliminarily saturated with a mercuric salt such as mercuric chloride ($HgCl_2$), mercuric bromide ($HgBr_2$). The saturated strip 38 and the pellets 46 are inserted in their respective position before the base sheet 12 and the retainer sheet 14 are sealed together.

The sampler 10 is used by peeling off the cover sheet 16 and immersing the lower portion of the sampler into the water to be tested and permitting a water sample 48 to accumulate in the chamber 18 and channel 20 up to the level of the fill inlet 40. The pellets 46 react with the water sample 48. During the reaction, the zinc metal and the potassium bisulphate react to form hydrogen gas among other things. If the water contains arsenicals, the hydrogen gas reacts to form arsine gas ($AsH_3$) which rises to the top of the chamber 18 and passes through the channel 36 into contact with the strip 38 saturated with mercuric chloride or mercuric bromide.

The arsine gas reacts with the mercuric chloride to form a discoloration of the strip which is slightly yellow if only a small amount of arsenic is present. If a large amount of arsenic is present, the color may vary from brown to dark brown. If no arsenic is present in the water, the hydrogen gas rises through the water unaffected and passes through the compartment 24 and the vent 42 in contact with the strip 38 without changing its color. However, if hydrogen sulfide ($H_2S$) is present in the water sample, a side reaction is incurred which causes a similar color change in the strip 38. For that reason, the pellets 46 may also be composed of a small amount of copper sulfate ($CuSO_4$) to avoid the side reaction. Moreover, other lesser common side reactions (or interferences) may be avoided by adding suitable deactivating compounds as well known in the art.

The second test for arsenic is also a colorimetric test which also uses the pellets 46 of zinc and potassium bisulphate for providing hydrogen gas which reacts with any arsenical in the water to produce arsine gas. However, the strip 38 is saturated with a suitable reagent such as silver diethyldithiocarbamate ($AgSCSN(C_2H_5)_2$) in pyridine solution which is retained in a manually rupturable sealing means such as a sack 50 until ready for use. The sack 50 is ruptured by squeezing the portions of the base sheet 12 and the retainer sheet 14 together. The solution passes through the channel 26 to the strip 38. A reaction occurs with the arsine gas to form a soluble red complex which indicates the presence of arsenic compounds in the water 48 being tested.

Accordingly, the sampler 10 may be used for testing for the presence of arsenic in a fluid such as water by using one of the accepted standard tests for arsenic.

Figure 4:
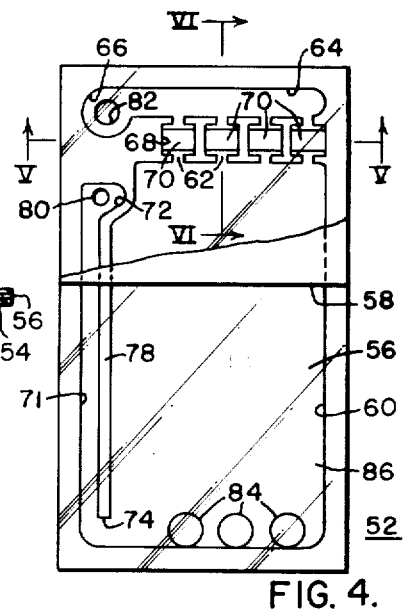
FIG. 4 is a top plan view of a sampler used for detecting the presence of a plurality of chemical contaminants in a fluid and showing only a portion of a peelable cover sheet intact.
Figures 5, 7, 8:
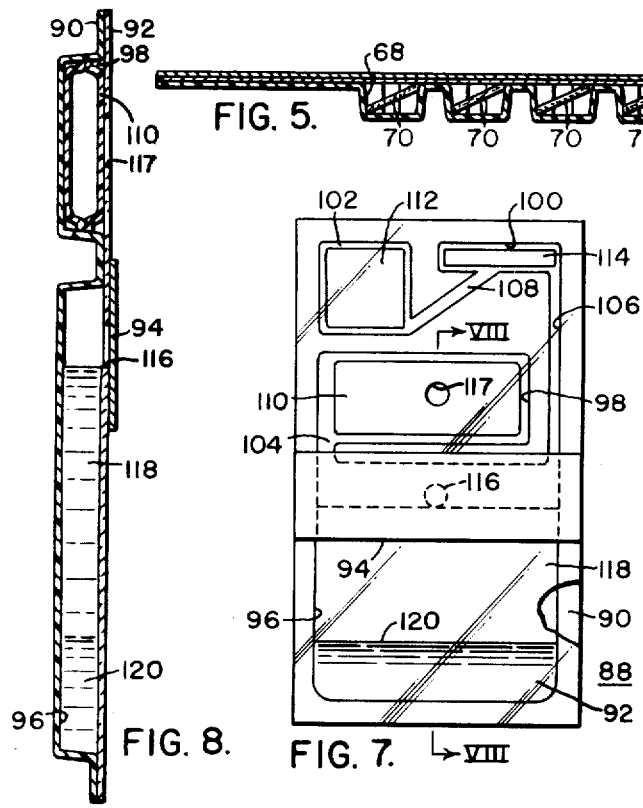
FIG. 5 is an enlarged transverse sectional view taken on the line V—V of FIG. 4.
FIG. 7 is a plan view of another embodiment of the invention.
FIG. 8 is an enlarged fragmentary vertical sectional view taken on the line VIII—VIII of FIG. 7.
Figure 6:
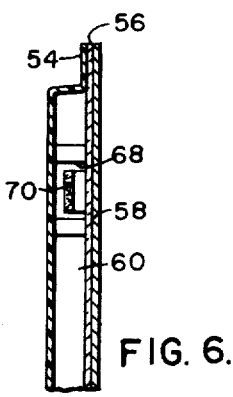
FIG. 6 is an enlarged fragmentary vertical sectional view taken on the line VI—VI of FIG. 4.

Another embodiment of the invention which uses the so-called "gas sweep" is shown in FIGS. 4, 5, and 6 in which a sampler 52 is provided with a base sheet 54, a retainer sheet 56, and a cover sheet 58. Like the base sheet 12 and the retainer sheet 14 of the sampler 10, the sheets 54 and 56 are composed of the same or similar material that is inert to most chemical reagents and particularly those used in detecting contaminants for which the sampler is provided. The retainer sheet 56 is preferably transparent. The sheets 54 and 56 may be composed of a synthetic plastic film similar to the sheets 14 and 16, or of polyethylene, polycarbonate, and polyvinylchloride. The cover sheet 58, which is shown only partially in FIG. 4 for illustrative purposes, is detachably secured to the upper side of the retainer sheet 56 in a fluid tight manner and is composed of an impervious material such as metal foil or any other material that is flexible and impermeable to fluids such as a cloth backed fabric having a moistureproof seal coating applied thereto, or Mylar.

The base sheet 54 is molded to provide a chamber 60 which may extend over a greater portion of the surface of the sampler. In addition, the base sheet is molded to provide a plurality of channels 62 which extend axially from the upper end of the chamber 60 to a manifold compartment 64 having a portion 66 at the left end as viewed in FIG. 4. Each channel 62 has an enlarged intermediate portion 68, in each of which is disposed a strip 70 of absorbent material such as glass fiber or other materials similar to that of the strip 38 in the sampler 10.

In addition, the base sheet 54 has a longitudinally extending channel 71 having an enlarged upper portion 72 and a lower end which communicates at 74 with the chamber 60. The channel 71 is separated from the chamber 60 by a sealed portion 78 similar to the portion 30 of the sampler 10.

The retainer sheet 56 is secured to the areas of the base sheet 54 except for the molded portions including the parts 60 to 76 except the strip 70. The base sheet 54 and retainer sheet 56 are secured together completely around their peripheries by a sealing process. The retainer sheet has a fluid inlet 80 and a gas vent 82 which communicate respectively with the channel portions 72 and the compartment portion 66.

Inasmuch as the sampler 52 contains a plurality of channels 62, the sampler may be a multi-purpose unit for either making a simultaneous test of a number of different contaminants, or for testing for varying concentrations of one contaminant in the fluid sample. Typically, two or more gases are generated in the fluid sample which impinge on a group of chemically treated strips 70 and selectively react to form a color change on the upper strip, if the contaminant is present. Observation of the change of color on each strip permits identification of the contaminant present.

In an alternative form, various strengths of strip impregnation may be used so that the sampler is employed to detect the presence and concentration of a single contaminant. For example, the sampler is used to generate a single gas such as hydrogen or carbon dioxide when testing for a specific contamination or constituent such as arsenicals and hydrogen sulfide in a water sample by generating hydrogen gas. For that purpose, the cover sheet 58 is removed to expose the fluid inlet 80 and the vent 82. The sampler 52 is then inserted into the water to be tested until a water sample 86 fills the channel 71 and chamber 60 to the level of the inlet 80. A mixture of zinc metal and potassium bisulphate in the form of compressed pellets 84 is located in the chamber 60 and some or all of the strips 70 are immersed or impregnated with mercuric chloride. If the arsenical is present in the water sample 86, the hydrogen gas generated in the manner described with respect to sampler 10 reacts to form arsine gas which reacts with the mercuric chloride to cause a telltale color change in the strip 70. As the gasses pass through the channels 62 they are vented outwardly through the compartment 68 and the vent 82.

Hydrogen gas may also be used to detect the presence of hydrogen sulfide in the water sample if one of the strips 70 is impregnated with lead acetate

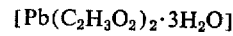

$$[Pb(C_2H_3O_2)_2 \cdot 3H_2O]$$

If the strip 70 turns black, hydrogen sulfide gas is present in the sample.

A similar sampler 52 may also be used to determine the presence of chlorine in a water sample. One of the pellets may be composed of a mixture of potassium bisulphate and sodium bicarbonate which in the presence of water generates carbon dioxide ($CO_2$) gas by impregnating one of the strips 70 with ortho-tolidine ($C_6H_2(CH_3)NH_2)_2$. If the strip 70 develops a yellow stain, chlorine is present in the water sample and is brought out by the carbon dioxide gas.

Thus, a grouping of contaminants according to the selection of the carrier gas generated by the pellets 84 is feasible as a convenient method of packing multi-purpose samplers. The samplers permit the identification of contaminants in turbid waters that normally hinder the usual colorimetric methods of determination. The multi-purpose nature of the sampler expidites the analysis of samples over existing techniques and the small size and disposable nature of the sampler makes it convenient for field use. Since the sampler is disposable, the usual problems of cleaning the apparatus to prevent contamination in subsequent tests is avoided.

The presence of some chemical contaminants in water may not be easliy determined by direct colorimetric reaction because of the difficulty in using the sample as normally received. This may be due to the interaction of the water with the indicating reagents, or where there is a need for higher levels of the contaminants to secure a test. It is desirable to use colorimetric determination in preference to other methods because of its inherent simplicity. The embodiment of the sampler 88 shown in FIGS. 7 and 8 is used to overcome these deficiencies. The sampler 88 makes use of the class of contaminants which involve a process of preliminarily separating or extracting the contaminant from the suspected sample. For that purpose, a solvent that is insoluble in the suspected sample such as water is first mixed with the sample and then allowed to separate. During the mixing stage, the contaminant leaves the water to be dissolved by the solvent. After separation, the colorimetric determination is made for the contaminant in the solvent rather than in the water. At that stage, care must be exercised to prevent the water from wetting the indication system. Thus, it is possible to concentrate the contaminant and increase the test sensitivity by limiting the amount of solvent.

The sampler 88 includes a base sheet 90, a retainer sheet 92, and a cover sheet 94. The base and retainer sheets 90 and 92 are composed of film material similar to the sheets 14 and 16. Likewise, the cover sheet 94 is composed of material similar to that of the cover sheets 16 and 58.

The base sheet 90 is a molded member having a chamber 96 extending over the lower half portion thereof, an intermediately disposed pocket 98, a compartment 100, and a pocket 102. The chamber 96 and the pocket 98 are intercommunicative via a passage 104. A channel 106 communicates between the chamber 96 and the compartment 100. Likewise, a channel 108 extends between the compartment 100 and the pocket 102. All other surfaces of the base sheet 90 are sealed to the retainer sheet 92 in a fluid tight manner.

The pockets 98 and 102 contain separate sacks 110 and 112, respectively. The compartment 100 contains a strip 114 of absorbent material. The absorbent material may be composed of glass fiber similar to the strips 38 and 70.

The retainer sheet 92 is provided with a sample inlet 116 and a vent 117 which when the cover strip 94 is removed permits the filling of the chamber 96 with a sample 118 of a fluid such as water to be tested.

The sampler 88 is adapted for making tests that use indicating reagents that cannot be mixed with the solvent, and where the water sample must also be kept separated from the indicator to achieve the desired test results. After a water sample 118 is placed in the chamber 96, the cover sheet 94 is replaced over the holes 116 and 117 to prevent the leakage of the sample during subsequent testing procedure and to establish a sealed air pressure within the sampler. The manually rupturable sack 110 is filled with the solvent such as chloroform or carbon tetrachloride which passes through the passage 104 when the sack is broken and enters the water chamber 96. The sampler is then shaken vigorously to mix the solvent with the water sample, the chloroform being a solvent for the contaminant present in the sample. The solution of contaminant and chloroform is immiscible and heavier than water and collects in a layer 120 on the bottom of the water sample 118 in the chamber 96 when the shaking has stopped. The solution 120 is brought into contact with the absorbent strip 100 by rotating the sampler clockwise as viewed in FIG. 7. During initial rotation, the upper layer of water 118 flows partially into the channel 106. The water 118 can be prevented from reaching the strip 100 by squeezing the portions of the sheets 90 and 92 above and below the sack 112 to create additional pressure in the channel 106. Continued rotation of the sampler 88 brings the chloroform solution 120 into position adjacent the lower end of the channel 106. At that point, any additional water remaining in the channel can be removed by additional squeezing of the sampler to force all of the water out of the channel 106.

Further squeezing of the sampler ruptures the sack 112 which contains a suitable reagent. The reagent passes through the channel 108 to the absorbent strip 114. After the sack 112 is ruptured, the squeezing pressure in the sampler is released and the chloroform-contaminant solution is drawn completely into the channel 106 and mixes with the indicator solution in the strip which causes a discoloration if the contaminant is present.

Figure 9:
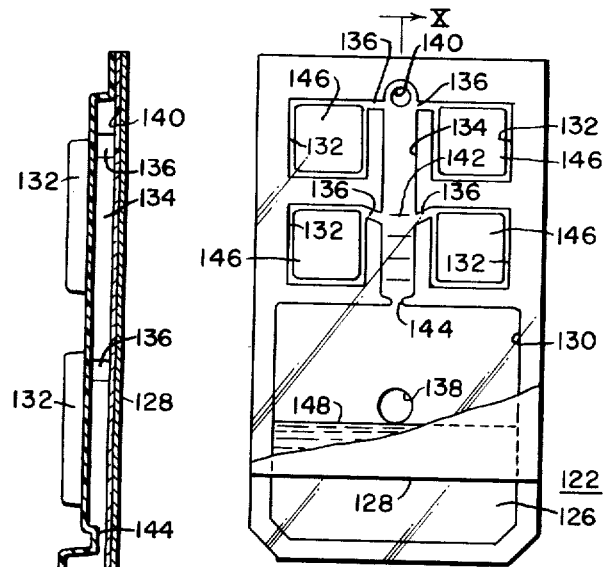
FIG. 9 is a plan view of another embodiment of the invention.
Figure 10:
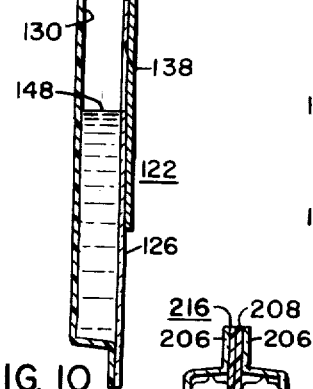
FIG. 10 is an enlarged vertical sectional view taken on the line IX—IX of FIG. 9.

In accordance with the present invention, a sampler as shown in FIGS. 9 and 10, may be used for performing titrations such as are commonly used for determining acidity of a fluid or concentration of contaminants. The sampler 122 has a base sheet 124, a retainer sheet 126, and a cover sheet 128 of compositions similar to the sheets of the foregoing samplers. The base sheet 124 is molded to provide a chamber 130, a plurality of pockets 132, an elongated conduit 134, and passages 136 leading from each pocket 132 to the conduit 134. The base and retainer sheets 124 and 126 are joined together in a fluid tight manner such as by a heat seal. Thus, the chamber 130, the pockets 132, the conduit 134, and the passages 136 are enclosed between the sealed portions of the sheets 124 and 126. The retainer sheet 126 includes a fluid inlet 138, an air vent 140, and is provided with equally spaced marks 142 extending over part of the length of the conduit 134 for indicating fluid level marks, similar to a buret scale.

As shown in FIG. 9, the lower end of the conduit 134 communicates with the lower chamber 130 through a restricted passage 144. Thus, the conduit 134 is useful as a buret for performing titrations.

Like the samplers 10 and 88, the sampler 122 is provided with at least one sack 146 containing a test reagent which sack is broken by a manual rupture for releasing the contents.

The sampler 122 may be used for running some chemical laboratory tritations similar to those used with typical laboratory glassware. The sampler is used by removing the cover sheet 128 to expose the fluid inlet 138 and the vent 140. The sampler is then dipped into the fluid such as water to collect a water sample 148 in the chamber 130 through the inlet 138. The inlet 138 is preferably located at the diagonal center of the chamber so that any subsequent tipping of the sampler even to an excessive degree prevents escape of the sampler fluid from the chamber 130 through the inlet.

After the sample 148 is collected, one or more of the reagent sacks 146 are ruptured by squeezing to release the titration reagent. Additional squeezing forces the reagent from the pocket 132 into the conduit 134 through the passage 136. When the sampler 122 is held upright, the reagent flows to the lower end of the conduit 134. The restrictive passage 144 is sufficiently small to prevent the reagent from flowing into the chamber 130 due to its capillary action. As a result, the reagent accumulates in the conduit 134 to the various levels of the marks or buret scale 142 in accordance with the amount desired as supplied from the several sacks 146. The buret scale marks 142 may indicate 0.05 milliliter (ml.) and each sack 146 may contain 0.25 milliliter of a titrating reagent. To overcome the capillary action of the reagent at the restricted passage 144, pressure is applied by squeezing the sampler 122 to cause drop size amounts of reagent to pass through the passage 144 and combine with the fluid sample 148. The operation may be hastened by closing the vent 140 either by replacing the adhesive sheet 126 or by placing a finger over it to prevent the escape of pressure applied to the conduit 134 during titration.

The sampler 122 may be used to determine the contaminant concentration in the test water 148 by using a standard solution of potassium permanganate ($KMnO_4$) which is commonly used to titrate such oxidizable substances as ferrous iron, oxalic acid, sulfites, and the like. The permanganate solution is stored in the sacks 146 until ready for use at which time it is conveyed to the buret in the manner described above. The permanganate solution is then titrated from the buret into the chamber 130 and the water sample 148 until a permanent pink color is produced showing a complete oxidation. Since the permanganate ion has a very intense coloring power, a mere drop in excess produces a readily detected coloration, furnishing a sharp end point. The volume of standard permanganate solution used is readily determined from the scale marks 142. One or more of the sacks 146 containing permanganate solution may be used during the titration to determine the end point of a given sample of water 148.

Figure 12:
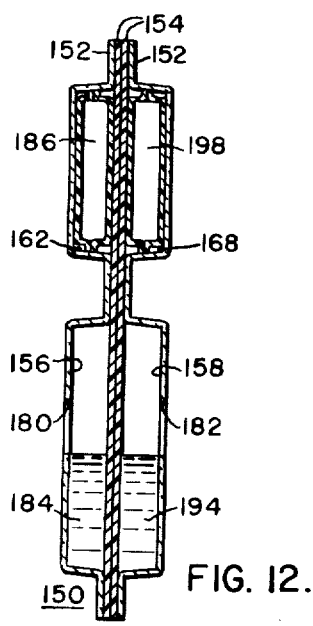
FIG. 12 is an end view showing the manner in which half portions of the sampler of FIG. 11 are folded together on a fold line to compare the colors of the separate solutions in each half portion of the sampler.
Figure 11:
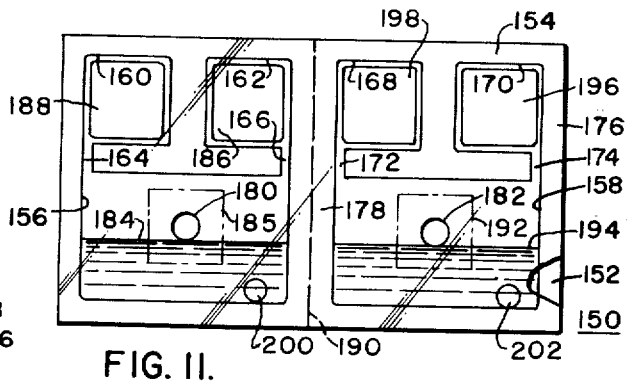
FIG. 11 is a plan view of another embodiment of the invention.

Another embodiment of the invention is shown in FIGS. 11 and 12 in which a sampler 150 has a base sheet 152, and a retainer sheet 154, which are composed of material similar to those of the base and retainer sheets of the prior described samplers. The base sheet 152 is molded to provide test chambers 156 and 158. The sampler 150 is divided into two half portions. A pair of pockets 160 and 162 are also provided by the base sheet 152 and the pockets communicate with the chamber 156 through conduits 164 and 166, respectively. Likewise, the base sheet 152 provides pockets 168 and 170 above the chamber 158 which pockets communicate with said chamber through conduits 172 and 174 respectively. All other portions of the sheets 152 and 154 are sealed together in a fluid tight manner including the peripheral border portion 176 as well as an intermediate strip 178 extending between the test chambers 156 and 158.

The base sheet 152 is provided with fluid inlets 180 and 182 for the chambers 156 and 158 respectively. Each inlet 180 and 182 is located at the center of the respective chambers 156 and 158 to avoid accidental spilling of the sample through the inlet even when the sampler 150 is turned completely around an axis or when the sampler is accidently dropped.

The sampler 150 may be used for the detection of a number of contaminants in a water sample 184 which is obtained by dipping the sampler into the water to be tested up to the inlet hole 180, after a cover strip 185 is removed from its position over the inlet hole. For example, the sample 150 may be used for testing for the presence of cyanide in water. For that purpose, a rupturable sack composed of plastic material such as monochlorotrifluoroethylene is provided in the pocket 162. The sack contains a chloramine "T" solution. When the sack 186 is broken, the solution drains through the conduit 166 into the test chamber 156 and mixes with the water sample 184. If cyanide is present in the water, it reacts with the chloramine solution to form cyanogen chloride. Barbituric acid in pyridine solution in another sack 188 located in the pocket 160 is provided for subsequent mixing with the water sample 184. The cyanogen chloride if present reacts with pyridine to give blutaconic aldehyde which in turn combines with the barbituric acid to give a red color to the sample indicating the presence of cyanide in the sampler.

If the color developed is strong enough to permit recognition, only one-half portion of the sampler 150 is necessary for the test. However, if the color change is weak, it may be less readily recognized. In that event, the tested sample should be compared with another sample which is not chlorinated. For that purpose, the sampler 150 may be folded upon itself to 180° along a fold line 190 extending through the intermediate strip 178. A cover strip 192 is removed from the inlet 182 and a second sample 194 of water is collected in the test chamber 158. A sack 196 of chloramine "T" solution may be omitted from the pocket 170 and a sack 198 of barbituric acid in pyridine solution is placed in the pocket 168. If the sack 196 of chloramine "T" solution is included, it is not ruptured to prevent a corresponding color change in the comparison sample. However, the barbituric acid in pyridine solution in the sack 198 is mixed with the water 194. When the half portions of the sampler 150 are folded on the line 190, any small difference in color in the solution 184 from the original color as shown in the solution 194 is accentuated when viewed from the end of both compartments simutlaneously as shown in FIG. 12. The color intensity is increased by the increased path length through the chambers 156 and 158 when viewed from the end of the chambers.

The sampler 150 may also be used for testing for the presence of lead in water. Lead in a water supply may arise from industrial, mine, and smelter discharges, or from the dissolution of old lead plumbing. Lead may be present as various lead compounds. The sampler 150 may be used by altering the reagents used in the cyanide test. For the lead test, the sack 186 is filled with chloroform or carbon tetrachloride. In addition, a pellet 200 is added in the test chamber 156. The tablet 200 is composed of diphenyl thiocarbazone ($CH_5NHNHCSN:NCH_5$), commonly known as dithizone. Inasmuch as the lead test is an extraction type test, the preferred procedure is the first rupture the sack 186 to expose the chloroform to the dithizone tablet 200 and obtain a solution thereof. Thereafter, the cover strip 185 is removed and a sample of water 184 is admitted through the inlet 180. The sample is mixed with the solution of chloroform and dithizone by shaking the sampler. It is then allowed to separate from the water in an immiscible layer at the bottom of the chamber 156. The presence of lead is indicated by a pink color in the chloroform layer.

If it is anticipated that the amount of lead in the sample will be slight and the intensity of the characteristic pink color of the test will be faint, it is therefore preferred that the sampler 150 be folded on the fold line 190 and compared with a corresponding solution 194 of reagents in the chamber 158 where a pellet 202 of dithizone is also disposed, but where the water sample is omitted. The resulting color of the solution in the chamber 158 is a characteristic light green which is more readily compared with a slight pink color of the extract in the chamber 156. The sampler may be slightly tilted to cause the dithizone solution to settle in corners of the chambers 156 and 158, thus concentrating the color at these corners and facilitating viewing of the differences.

Figure 13:
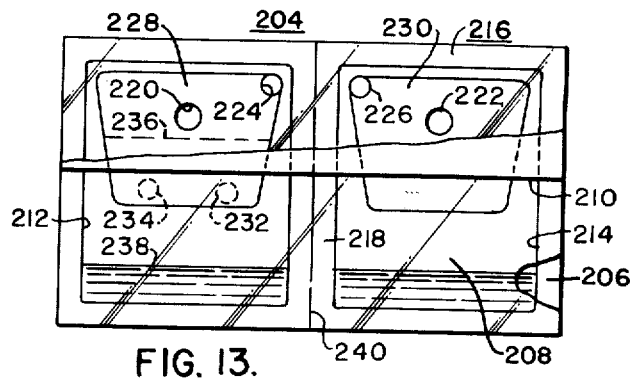
FIG. 13 is a plan view of another embodiment of the invention.

Another type of sampler 204 is shown in FIGS. 13 and 14 which includes a base sheet 206, a retainer sheet 208, and a cover strip 210. The base sheet 206 is molded to provide two separate test chambers 212 and 214. The retainer sheet 208 is sealed to the base sheet in a fluid tight manner at its peripheral portion 216. In addition, the chambers 212 and 214 are separated by an intermediate sealed portion 218. The retainer sheet 208 has a pair of fill inlets 220 and 222 as well as a pair of vent holes 224 and 226 corresponding to each chamber 212 and 214. A filter pocket or sack 228 and 230 is disposed in each chamber 212 and 214, respectively. Each sack 228 and 230 is composed of a fluid filter material such as filter paper and is provided with openings corresponding to the respective inlets 220 and 222 and vents 224 and 226.

In many colorimetric chemical determinations, it is necessary to filter solid particles of the liquid samples before proper color observations may be made. If the sample is taken from a river or other natural water location, the sample may be discolored by silt, or particulate arising from domestic and industrial waste. In other cases, the solids are intentionally added as reagents which are needed as part of the normal laboratory procedure for producing the desired colorimetric reactions. These solids must be subsequently removed to prevent the masking of the desired colors. The sampler 104 facilitates the testing of samples that require filtration. Accordingly, the sampler may be used to test for the presence of sulfate, fluorides and/or phosphates in water.

For the sulfate test, a color indicator 232 and a buffer 234 are added to the unfiltered sample within the filter sack 228. The indicator 232 is preferably barium chloranilate ($BaC_6Cl_2O_4$). The buffer is a weak acid source such as potassium biphthalate. Where the water to be tested is sufficiently acidic, the buffer is not necessary, but where the water is alkaline, the buffer neutralizes the alkalinity and makes the water slightly acidic. The test proceeds by removing the cover sheet 210 and immersing the sampler 204 into the water to be tested to permit a sample to enter the sack 228 through the inlet 220. The water sample 236 originally accumulates in the sack 228 and dissolves the indicator 232 and the buffer 234. The resulting solution filters through the sack 228 and ultimately collects at the bottom of the test chamber 212 as shown in FIG. 13.

Each half portion of the sampler 204 operates even though there is no sulfate present, the indicator causes a slight color to appear in the sample. With sulfate present in a properly buffered sample, the color intensifies. Where the sampler 204 is used for comparative purposes in judging close color differences, a blank sample is collected in the chamber 214 which sample is merely filtered through the filter sack 230 to remove solid particles that discolor the sample and prevent the proper colorimetric comparison. Thus, the blank sample in the chamber 214 serves as a reference for judging the amount of sulfate, or color, that is noted in the test chamber 212. For that purpose, the sampler 204 may be folded 180° on the fold line 240 which extends through the sealed portion 218, as shown in FIG. 14. Because the sample is of unknown acidity, it may be properly buffered in the blank chamber with the presence of a buffering reagent. In order to offset any inherent acidity that may be present, a weak alkali may be placed in the blank chamber 214.

For low concentrations of sulfate, the color difference between the sample and test chambers is enhanced by folding the ticket on the fold line so that the edges of both chambers may be viewed simultaneously. The view for the edge takes advantage of the long path length through the filtered sample in the bottom of the chambers. Using this technique, a value may be assigned to the minimum concentration of sulfate that is present when a color difference is apparent to the average observer as shown in FIG. 14.

For high concentrations of sulfate, the color intensity of the sample in the test chamber will be so pronounced that it is not necessary to use the comparison to a blank method. Instead, the sampler may be made in advance with two test chambers, in either printed color standards or small pouches of colored liquid used for comparing the color intensity. Matching of the color standards will yield an equivalent sulfate concentration value.

The sampler 204 may also be used to test for chlorine. In this determination, the indicator 232 is ortho-tolidine ($—C_6H_3—4—NH_2—3—CH_3)_2$. The indicator is added to a properly buffered sample of water and the resulting intensity of the color is dependent upon the concentration of chlorine present.

Other embodiments of the sampler 204 are shown in FIGS. 15 and 16. In FIG. 15, a sampler 242 is composed of a base and retainer sheet in a manner similar to the prior samplers. The base sheet is molded to form an upper pair of chambers 244 and 246 and a lower pair of chambers 248 and 250. A channel 252 extends between the chambers 244 and 248. Likewise, a channel 254 extends between the chambers 246 and 250. The upper sheet has an opening 256 for the chamber 244 and an opening 258 for the chamber 246. The openings 256 and 258 are oversized holes which serve as liquid inlets and vents. The lower chambers have vent openings 249 and 251. All other portions of the base and retainer sheet are held together in a fluid tight manner such as by heat sealing. As shown in FIG. 15, the channels 252 and 254 are filled with filter plugs 257 and 259, respectively, which plugs are composed of glass frit, filter paper, or other suitable filter material.

In operation, the sampler 242 may be immersed after removal of a cover strip from the inlets 256 and 258 for the collection of a sampler of water. The water may be tested for sulfate or chlorine as described above with respect to sampler 204 in which case indicator tablets 232 and buffer pellets 234 are provided within the chamber 244 for reaction with the sample. The sampler may be dipped with vents 249 and 251 open by holding it with the fold line uppermost, or the vents may be opened after chambers 244 and 246 have been filled. Thereafter, the water filters through the plug 257 and collects in the lower chamber 248. A blank sample is run through the chambers 246 and 250 for comparison of colors where the color change in the test sample 260 is slight.

In FIG. 16, a sampler 262 is provided with a pair of upper collection chambers 264 and 266 and a pair of lower test chambers 268 and 270. An interconnecting channel 272 exists between the chambers 264 and 268. Likewise, an interconnecting channel 274 exists between the chambers 266 and 270. Vent openings 269 and 271 are provided. Opposite sides of the channels 272 and 274 may be of irregular configurations such as dovetail to retain loose material forming a porous plug 276 and 278 respectively between the respective chambers. The plugs 276 and 278 may be composed of a filter material such as glass wool, cellulose fibers, or other suitable filter material.

In other respects, the sampler 262 resembles the sampler 242 and is used in a similar manner. The samplers are also provided with similar fold lines 280 to facilitate comparison of a test and blank sample in separate half portions of the samplers.

The samplers may also be used to test water for the presence of fluoride and/or phosphate. For that purpose, the indicator 232 may be composed of lanthanum chloranilate $(La_2(C_6Cl_2O_4)_3 \cdot nH_2O)$. The chloranilate reagent is an indicator for both fluorides and phosphates and will show either one or both when present. To determine which of the two is present requires additional chemical procedure not disclosed herein.

When independent tests are run in each half of the sampler, it is desirable to open the fill and vent holes of each half separately. This is accomplished by using an adhesive strip over the holes. The strip covers the holes for storage purposes and is removed when a test is run. The strip may be positioned by the operator to expose only one vent and fill hole at a time, so that the remaining chamber is closed.

The reagents required for testing purposes may be provided in different forms and be stored in the sampler in a variety of ways. Dry reagents may be pelletized and glued to the side of the pocket. Powders may be painted on the inside of the pocket where they will be washed free when the test is in progress. Liquid reagent may be stored in a rupturable plastic blister or breakable glass vial. Small accurately controlled amounts of reagent may also be obtained by punching dots out of impregnated sheets of inert paper substrate. Conventional filter paper can be folded into pockets for use as filters in the sampler 204. Nylon or other plastic mesh has the advantage of being heat sealable.

Another embodiment 282 of the invention is shown in FIG. 17. It resembles either sampler 10 or 88 both of which are provided with strips of absorbent material to which a chemical reagent is subsequently added. For purposes of description, the change in structure will be described with respect to the sampler 10 having the strip 38 of absorbent material. If the sampler is used with a silica gel impregnated strip 38 or other chemical system that is very sensitive to minute leakage from a chemical reagent within the sack 50, the base sheet 12 and the retainer sheet 14 may provide the pocket 22 (FIG. 1) which contains the stack 50 of a highly penetrating reagent such as chloroform. In addition, a shortened channel 26A (FIG. 17) is provided which stops short of the channel 24 containing the strip 38. The area 286 between the channel 26A and 38 is heat sealed in a fluid tight manner in a conventional manner. Thus, any leakage of the reagent from the sack 50 is prevented from reacting with the chemical saturated strip 38 before the test is conducted.

In addition, the sheets 12 and 14 forming the pocket 22 are provided with score lines 288 and 290 to permit easy severance of the scored area when the test is conducted. Thus, the sack 50 of reagent is completely isolated from the strip 38 to prevent a reaction due to leakage. When the test is run, the scored area is removed from the sampler by tearing along the score lines 288 and 290. The sack 50 is ruptured by squeezing and the lower end of the channel 26A is placed next to the vent opening to apply the reagent to the strip 38.

In addition, the sampler 282 may be provided with a score line 292 forming a tear tab 294. The line 292 extends from the edge of the sampler 282 and over the channel portion 32 when the sampler 282 is ready for use, the tear tab 294 is removed to expose the channel portion 32 for filling with a water sample. Thus, the detachable tear tab 294 may be used as a substitute for the inlet 40 and the cover sheet 16. (FIG. 1.) Similarly, a tear tab 295 is removed by severing the sampler along score line 291 so that a vent opening is produced which is a substitute for vent hole 42. (FIG. 1).

As shown in FIG. 3, the chamber 18 may be enlarged by providing folded or bellows-like side walls 306 and 308 to obtain larger volumes of test samples where necessary.

The chemical detection samplers 10 and 88 may be used for testing gases by bubbling the gas directly through the sampler or by dipping the sampler into a container of fluid that has a gas bubbled through it. As shown in FIG. 18, a conventional double acting rubber bulb 296 is attached by a tube 298 to the fill inlet 42 of the sampler 10. A tube 300 is connected to the gas to be tested so that the gas is bubbled through water or other suitable solvent within the sampler 10. Any contaminant in the gas is picked up in the water or solvent so that a test may be performed in the manner described.

If the contaminant is the type that tends to be picked up by the rubber of which the bulb 296 is composed, the procedure can be reversed by using the suction end or tube 300 of the bulb which is inserted into the vent 42 of the sampler 10 and pulling the air through the water or other suitable solvent.

Accordingly, the device of the present invention provides for a chemical contmainant sampler that may be used for testing fluids such as water for the presence of a variety of chemical contaminants. However, fluids other than water may be tested. The sampler is disposable and generally replaces standard laboratory glassware used in similar chemical procedures. The sampler of the present invention has the advantage of simplifying and speeding tests by using pre-measured amounts of reagents. The sampler combines many pieces of standard laboratory equipment into one unit and thereby eliminates the chance of mistakes and the human element.

Moreover, though typical colorimetric tests have been described, other types of chemical tests may be performed with suitable changes of reagents. For example, the samplers may be used for nephelometric, or turbidimetric determinations which result in the appearance of a precipitate.

It is understood that the above specification and drawings are merely exemplary and not in limitation of the invention.

What is claimed is:

1. A disposable sampler for testing for the presence of constituents in fluids comprising a laminated package having a base sheet and a retainer sheet, the sheets being composed of relatively impermeable materials, the base sheet having a fluid-holding chamber, the retainer sheet applied to the base sheet and covering the chamber, one of the sheets having manually detachably covering opening means leading to the chamber for admitting a fluid to be tested, and chemical reagent means sealably held within the package and reactive with the constituent in the fluid for yielding a chemical test result.

2. The sampler of claim 1 in which the opening means includes a fluid inlet in one of the sheets and includes a cover sheet detachably mounted on said one sheet and covering the inlet in a fluid tight manner.

3. The sampler of claim 1 in which the opening means includes tear tab means for providing a sealed unit before use and for providing a fluid inlet when the sampler is used.

4. The sampler of claim 1 in which the chamber is a molded depression in the base sheet which is composed of one of a material selected from the group consisting of polyperfluorinated plastic, a chlorofluorinated plastic and vinyl plastic.

5. The sampler of claim 1 in which the retainer sheet is composed of a polyperfluorinated plastic.

6. The sampler of claim 1 in which the package has at least two fluid holding pockets, and the chemical reagent means being retained in at least one pocket.

7. The sampler of claim 6 in which the package has a fold line on which one pocket is foldable over the other pocket for comparing variations of color of fluids in the pockets.

8. The sampler of claim 1 in which a sack of a fluid filter material is contained within the chamber and the interior of the communicates directly with the opening means.

9. The sampler of claim 1 in which a reagent is contained in the package, and a rupturable sealing means is provided between the chamber.

10. The sampler of claim 9 which includes a buret portion and a restrictive flow passage portion leading to the chamber.

11. The sampler of claim 1 in which one of the base and retainer sheets has a reagent containing pocket communicative with the compartment.

12. The sampler of claim 11 in which one of the base and retainer sheets has a reagent containing pocket, the portion of the sheets containing the pocket being detachable and having a rupturable reagent containing sack, and the retaining sheet having an inlet through which reagent may be introduced into the compartment.

References Cited
UNITED STATES PATENTS
3,169,834   2/1965   Otto _____ 23—253

FOREIGN PATENTS
691,515   5/1953   Great Britain _____ 23—254

BENJAMIN R. PADGETT, Primary Examiner

F. M. GITTES, Assistant Examiner

U.S. Cl. X.R.

23—254 R